(12) United States Patent
Devitt et al.

(10) Patent No.: US 7,095,026 B2
(45) Date of Patent: Aug. 22, 2006

(54) METHODS AND APPARATUSES FOR SELECTIVELY LIMITING UNDESIRED RADIATION

(75) Inventors: John W. Devitt, Maineville, OH (US); Mark E. Greiner, Mason, OH (US); Jeffrey J. Voelker, Butler, PA (US); David R. Wade, Cincinnati, OH (US)

(73) Assignee: L-3 Communications Cincinnati Electronics Corporation, Mason, OH (US)

( * ) Notice: Subject to any disclaimer, the term of this patent is extended or adjusted under 35 U.S.C. 154(b) by 279 days.

(21) Appl. No.: 10/703,136

(22) Filed: Nov. 6, 2003

(65) Prior Publication Data

US 2004/0188617 A1    Sep. 30, 2004

Related U.S. Application Data

(60) Provisional application No. 60/425,004, filed on Nov. 8, 2002.

(51) Int. Cl.
*G01J 5/00* (2006.01)
(52) U.S. Cl. .................................. 250/338.1
(58) Field of Classification Search ............... 250/352, 250/332, 338.1
See application file for complete search history.

(56) References Cited

U.S. PATENT DOCUMENTS

| | | | |
|---|---|---|---|
| 2,769,111 A | 10/1956 | Sadowsky | |
| 2,897,399 A | 7/1959 | Garwin et al. | |
| 3,020,406 A | 2/1962 | Whitney | |
| 3,341,826 A | 9/1967 | Lee | |
| 3,593,029 A | 7/1971 | Sakaguchi et al. | |
| 3,714,430 A * | 1/1973 | Finvold et al. | 250/338.1 |
| 3,973,118 A | 8/1976 | LaMontagne | |
| 4,559,695 A | 12/1985 | Baker | |
| 4,628,206 A | 12/1986 | Astheimer | |
| 4,687,329 A | 8/1987 | Schultz | |
| 4,822,998 A | 4/1989 | Yokota et al. | |
| 5,041,723 A | 8/1991 | Ishida et al. | |
| 5,166,755 A | 11/1992 | Gat | |
| 5,210,400 A | 5/1993 | Usami | |
| 5,227,656 A | 7/1993 | Timlin et al. | |

(Continued)

FOREIGN PATENT DOCUMENTS

JP    60050426 A    *    3/1985

OTHER PUBLICATIONS

Website printout, Understanding and Utilizing Focal Plane Arrays (FPA), http://x26.com/infrared/images/fpa.htm, printed Oct. 14, 2002.

(Continued)

*Primary Examiner*—Constantine Hannaher
(74) *Attorney, Agent, or Firm*—Dinsmore & Shohl, LLP

(57) ABSTRACT

An apparatus for selectively limiting undesired radiation from a scene which, in one embodiment, includes an optic that is operative to attenuate radiation by selectively losing transparency in response to radiation within a first wavelength band from a source. The loss of transparency affects the passage through the optic of radiation within a second wavelength band from that source. The optic can be positioned between a sensor and the scene such that the sensor is configured to receive radiation from the scene through the optic. In one embodiment, an optical limiter includes a plurality of such optics, wherein the optical limiter is configured to facilitate transmission of light corresponding to a scene, and wherein each optic is configured to receive a respective portion of the light corresponding to a respective portion of the scene. A light detector assembly and a method of limiting light energy are also included.

28 Claims, 4 Drawing Sheets

U.S. PATENT DOCUMENTS

| | | | |
|---|---|---|---|
| 5,260,826 A | 11/1993 | Wu | |
| 5,304,500 A | 4/1994 | Timlin et al. | |
| 5,351,151 A | 9/1994 | Levy | |
| 5,360,973 A | 11/1994 | Webb | |
| 5,497,269 A | 3/1996 | Gal | |
| 5,550,373 A | 8/1996 | Cole et al. | |
| 5,600,486 A | 2/1997 | Gal et al. | |
| 5,618,654 A * | 4/1997 | Takei et al. | 430/347 |
| 5,777,329 A | 7/1998 | Westphal et al. | |
| 5,877,500 A * | 3/1999 | Braig et al. | 250/353 |
| 5,953,155 A | 9/1999 | Eckel, Jr. et al. | |
| 5,960,097 A | 9/1999 | Pfeiffer et al. | |
| 6,157,017 A | 12/2000 | Kim | |
| 6,301,004 B1 | 10/2001 | Jung et al. | |
| 6,444,984 B1 | 9/2002 | Lundgren et al. | |
| 6,449,023 B1 | 9/2002 | Swanson et al. | |

OTHER PUBLICATIONS

Del Bianco, Alessandro, Gabriella Serafino and Gunter Spock, "An Introduction to Spectral Imaging," Carinthian Tech Research GmbH, Europastrasse 4 A-9524, Village St. Magdalen, Austria.

Ge, Jian, D. Ciarlo, P. Kuzmenko, C. Alcock, B. Macintosh, R. Angel, N. Woolf, M. Lloyd-Hart, R. Q. Fugate and J. Najita, "Adaptive Optics High Resolution Spectroscopy: Present Status and Future Direction."

Wong, W., C. shih, K. Broderick, S. Desai, D. Freeman, G. Nielson and A. Sinha, "Analog Tunable Gratings—A Piezoelectric Implementation with Nanometer Deformatin."

Website printout, CMC Electronics Cincinnati, *TVS-8500*, http://www.cmccinci.com/irdata.htm, printed Nov. 6, 2003.

Website printout, CMC Electronics Cincinnati, *NightFalcon II*, http://www.cmccinci.com/irdata.htm, printed Nov. 6, 2003.

Website printout CMC Electronics Cincinnati, *NightMaster*, http://www.cmccinci.com/irdata.htm, printed Nov. 6, 2003.

Website printout, CMC Electronics Cincinnati, *Delco Target Acquisition System*, http://www.cmccinci.com/irdata.htm, printed Nov. 6, 2003.

Website printout, CMC Electronics Cincinnati, *CE011A InSb 1024×1024*, http://www.cmccinci.com/irdata.htm, printed Nov. 6, 2003.

Website printout, CMC Electronics Cincinnati, *NightConqueror 640*, http://www.cmccinci.com/irdata.htm, printed Nov. 6, 2003.

Website printout, CMC Electronics Cincinnati, *NightConqueror 256*, http://www.cmccinci.com/irdata.htm, printed Nov. 6, 2003.

Website printout, CMC Electronics Cincinnati, *NightMaster SeeSpot*, http://www.cmccinci.com/irdata.htm, printed Nov. 6, 2003.

Website printout, CMC Electronics Cincinnati, *CE961 InSb 256×256*, http://www.cmccinci.com/irdata.htm, printed Nov. 6, 2003.

Website printout, CMC Electronics Cincinnati, *Cryogenic Coolers*, http://www.cmccinci.com/irdata.htm, printed Nov. 6, 2003.

Website printout, CMC Electronics Cincinnati, *Infrared Surveillance System*, http://www.cmccinci.com/IRSurvSys.htm, printed Nov. 6, 2003.

Website printout, CMC Electronics Cincinnati, *AN/AAR-44A*, http://www.cmccinci.com/44a.htm, printed Nov. 6, 2003.

\* cited by examiner

METHODS AND APPARATUSES FOR SELECTIVELY LIMITING UNDESIRED RADIATION

This application claims the benefit of U.S. Provisional Application Ser. No. 60/425,004 filed on Nov. 8, 2002, the entire disclosure of which is hereby incorporated herein by reference.

TECHNICAL FIELD

The present invention relates generally to optical systems, and in particular relates to methods and apparatuses for selectively limiting undesired radiation in such systems.

BACKGROUND OF THE INVENTION

A variety of optical detection systems have been developed which are sensitive to radiation within various wavelength bands. For example, digital cameras are commercially available to consumers and are configured to detect and record reflections and emissions of light having a wavelength in the visible spectrum band, thereby effectively capturing and recording scenes. As another example, infrared imaging systems are provided to detect radiation in the infrared wavelength band that is emitted from or reflected by objects within a scene. Such infrared imaging systems can view objects within scenes that would normally not be apparent to an optical detection system capable only of detecting light in the visible spectrum. These systems are particularly useful for real-time viewing of scenes at night or through smoke, and are frequently utilized in military equipment for detecting missiles, aircraft, vehicles, vessels, and the like.

In use, optical systems (e.g., visible or infrared) are often subjected to undesired radiation from the sun or from another light source, for example. In conventional detectors, such undesired radiation can saturate the detector and make it difficult and sometimes impossible for the detector to distinguish objects of interest from the undesired radiation. For example, in an infrared imaging system, the amount of solar radiation can be extremely large when compared to the radiation signals available from objects to be detected, and the solar radiation can therefore saturate the infrared detector. As an example, with conventional infrared imaging systems, it can be difficult to detect an aircraft flying near the sun, as the amount of infrared radiation from the sun is large when compared to the infrared radiation from the aircraft. The solar radiation can cause blooming in the image, reduce sensitivity in the affected area, and even permanently damage the detector. Moreover, the intense solar radiation can scatter in the optical components, and such scattering can reduce or eliminate the detector's ability to show the presence of the aircraft. The sun can also cause similar problems in a system configured to detect light in the visible wavelength band. Moreover, like solar radiation, radiation from an intense artificial light source (e.g., an incandescent light) aimed in the direction of an optical detector could cause saturation of the optical detector.

Various techniques could be utilized to attempt to alleviate the saturation and blooming problems caused by solar radiation and other undesired types of radiation. For example, optical filters could be utilized to filter radiation from the undesired source. However, many such filters typically attenuate the entire image and therefore can simultaneously attenuate radiation from objects of interest, making them more difficult to detect. Moreover, electronic techniques, such as digital anti-blooming methods, could be utilized in an attempt to attenuate the effects of undesired radiation. However, purely electronic techniques typically cannot accommodate the large flux levels often present (e.g., from the sun) while still providing accurate detection of background and adjacent areas and while quickly recovering from the blooming effect. In addition, while non-linear absorbers could be utilized, such absorbers usually require extremely high photon flux in the wavelength band of interest (e.g., the infrared band), such as would be emitted from a high power laser, before their attenuating function becomes active. It is therefore desirable to provide improved methods and apparatuses for selectively limiting the effects of undesired radiation, such as solar radiation, in an optical system.

SUMMARY OF THE INVENTION

Accordingly, it is an object of the present invention to provide improved methods and apparatuses for selectively limiting the effects of undesired radiation, such as solar radiation, in an imaging system. To achieve the foregoing and other objects, and in accordance with the purposes of the present invention defined herein, methods and apparatuses for selectively limiting undesired radiation are disclosed.

In one embodiment of the present invention, an infrared detector assembly is provided comprising an infrared sensor configured to receive infrared radiation emitted from a scene. The infrared detector assembly further comprises at least one limiter element positioned between the sensor and the scene, such that the infrared sensor is configured to receive the radiation through the limiter element. The limiter element is configured to limit the amount of infrared radiation that may pass to the sensor in response to the receipt of radiation that is outside of the band of interest (e.g., the infrared band).

In another embodiment of the present invention, the infrared sensor comprises a focal plane array. In yet another embodiment of the present invention, the infrared detector assembly comprises a cold filter, and an infrared sensor is configured to receive radiation only after the radiation has passed through the cold filter.

In still another embodiment of the present invention, a photochromic optic is provided that is operative to selectively attenuate radiation by selectively losing transparency in response to increased radiation in the ultraviolet band. The loss of transparency attenuates the passage through the photochromic optic of radiation in the infrared band.

In another embodiment of the present invention, an optical limiter is provided comprising an array of optics. The optical limiter is configured to facilitate transmission of light corresponding to a scene, and each optic is configured to receive a respective portion of the light corresponding to a respective portion of the scene. At least one respective portion of light comprises low and high frequency radiation. An optic receiving the at least one respective portion of light is configured to selectively attenuate the low frequency radiation when the intensity of the high frequency radiation increases. For example, the low frequency radiation may comprise infrared light and the high frequency radiation may comprise visible or ultraviolet light.

In still another embodiment of the present invention, adjacent optics of an optical limiter are separated by at least one barrier.

In yet another exemplary embodiment of the present invention, a light detector assembly is provided comprising a focal plane array having a plurality of pixels, and each pixel is included within one of a plurality of fields. Each pixel includes at least one sensor configured to sense light having a first wavelength. An optical limiter is associated with each field, each optical limiter being configured to selectively attenuate light within a first wavelength band when the intensity of light within a second different wavelength band increases. This embodiment also includes a macroscopic lens configured to converge light having energy in both the first and second wavelengths toward the optical limiter.

In still a further embodiment of the present invention, a method of limiting light energy is provided comprising receiving light corresponding to a scene. Each of a plurality of optics receives a respective portion of this light, and at least one respective portion comprises light within a first wavelength band and light within a second but different wavelength band. For each optic receiving the at least one respective portion, the light within the first wavelength band is selectively attenuated by the optic when the intensity of light within the second wavelength band received by the optic increases. The method further comprises sensing the attenuated light having the first wavelength.

In yet another embodiment of the present invention, a sensor is provided comprising pixels configured to sense radiation within a predetermined wavelength band from a scene. Each pixel is associated with only one of a plurality of filter elements, and each element is disposed between the scene and the pixel. Each filter element is configured to selectively attenuate the passage of radiation within the predetermined wavelength band in response to radiation outside of the predetermined wavelength band. This embodiment further includes barrier elements arranged between the filter elements and configured to prevent spillover of attenuation effects from one filter element to an adjacent filter element.

The present invention is advantageous for providing improved methods and apparatuses for selectively limiting the effects of undesired radiation, such as solar radiation, in an optical system. Additional objects, advantages, and novel features of the invention will be set forth in the art upon examination of the following description of exemplary embodiments or may be learned with practice of the invention. The objects and advantages of the invention may be realized or attained by means of the instrumentalities and combinations as set forth herein and as will be apparent to those of ordinary skill in the art.

BRIEF DESCRIPTION OF THE DRAWINGS

It is believed that the present invention will be better understood from the following description taken in conjunction with the accompanying drawings in which.

DETAILED DESCRIPTION OF ILLUSTRATIVE EMBODIMENTS

Figure 1:
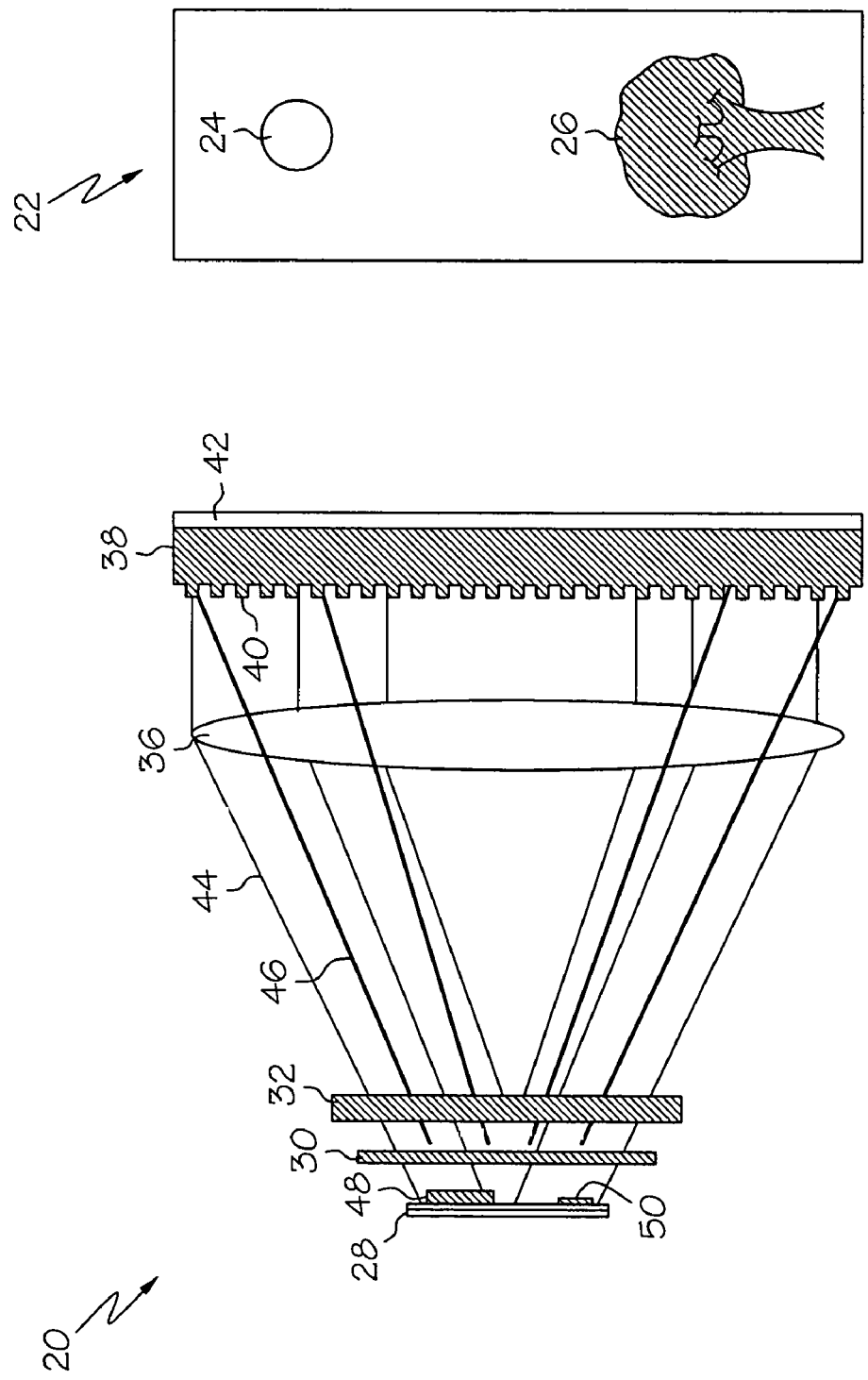
FIG. 1 is a schematic diagram depicting an exemplary embodiment of a detector assembly made and operating according to the principles of the present invention.

The present invention and its operation is hereafter described in detail in connection with the views and examples of FIGS. 1–4, wherein like reference numbers indicate the same or corresponding elements throughout the views. FIG. 1 depicts an exemplary detector assembly 20 in accordance with one embodiment of the present invention. Detector assembly 20 might be suitable for association with a digital camera, a digital microscope, digital binoculars, an infrared thermometer, or any other device suitable to detect light emitted or reflected from a scene. In one embodiment, as depicted by FIG. 1, detector assembly 20 can detect light from scene 22, wherein scene 22 can include the sun 24 and a tree 26. Of course, in other embodiments, scene 22 might include any other devices, objects, or living organisms. For example, scene 22 might involve a person, an airplane, a missile, a vehicle, a building, or any other object capable of emitting or reflecting light.

Detector assembly 20 can include a sensor 28 for detecting light emitted or reflected from objects within scene 22. In one embodiment, sensor 28 might comprise a focal plane array. A focal plane array can have a detection surface comprising a plurality of pixels that are configured to receive light. Each pixel can include one or more detectors that have an electrical property affected by optical energy incident thereon. For example, a detector can comprise a semiconductor diode having a junction separating first and second differently doped regions. Such a diode can be configured to transmit energy in response to its detection of light from scene 22. In other words, the simultaneous signals from the various detectors at the pixel locations of the array provide a representation of the scene in real-time. As additional pixels are included within the focal plane array, the resolution of the focal plane array is increased. Accordingly, in one embodiment, the sensor 28 comprises a focal plane array having enough pixels to provide adequate resolution for the intended use of detector assembly 20. Exemplary configurations of focal plane arrays that can be utilized are described in U.S. Pat. Nos. 5,227,656 and 5,304,500, the entire disclosures of which are hereby incorporated herein by reference. In one embodiment, detector assembly 20 might include a cooling system (e.g., involving cryogenics) to provide cooling to sensor 28 and/or other components of detector assembly 20 (e.g., a cold filter as discussed further below), such as for example to increase the sensitivity of detector assembly 20 to infrared radiation.

This exemplary detector assembly 20 can also comprise one or more optics configured to converge light from scene 22 into sensor 28. Such optics can include one or more lenses, plates, coatings, windows, gratings, mirrors, reflective surfaces, or other devices or structures configured to manipulate or pass light. For example, as depicted in FIG. 1, one such optic might include a planar window optic, such as a plate 38. A grating 40 might be associated with plate 38 and may be configured to selectively cause light from scene 22 to converge into sensor 28, for example. In some embodiments, grating 40 can be provided integrally with plate 38, such as by etching, for example. In another embodiment, grating 40 may be applied (e.g., as a film) to plate 38. Grating 40 can be configured to diffract high-energy photons, for example, and can be simpler to apply to a substantially flat surface (e.g., plate 38) than to a complicated spherical surface (e.g., lens 36). Grating 40 can also serve as a low-index coating for internal reflection loss mitigation due to the lowered effective index of refraction of the partial-air/partial-optic volume at the inner edge of plate 38. Thus grating 40 can help couple the infrared radiation through plate 38.

Plate 38 might further be provided with one or more coatings or films on one or both sides of plate 38. For example, coating 42 might be configured to selectively filter light from a scene, such as by rejecting light within one or more wavelength bands. Accordingly, coating 42 can prevent such rejected light from passing into detector assembly 20. For example, dual band coatings can be provided in order that an ultraviolet wavelength band and a visible or infrared wavelength band of interest can be passed into detector assembly 20, while out of band radiation is denied such entry. Such a dual band coating can thereby ensure a sharp focus for both wavebands and avoid unwanted mixed diffractive and refractive effects in the intervening wavelengths, and can accordingly help to ensure that broadband flux levels in background areas are maintained in a relatively low state.

The outer-most optic (e.g., plate 38) could provide a robust surface suitable to protect sensor 28 and/or other components of detector assembly 20 from adverse environmental conditions, such as those commonly encountered by motor vehicles or projectiles. For example, plate 38 (with optional coating 42) can provide protection to the internal components of detector assembly 20, such as sensor 28, when detector assembly 20 is associated with an airplane or missile traveling at high-altitude and high-speed. In such a configuration, plate 38 can be disposed upon an external surface of the airplane or missile and can facilitate light passage from a scene (e.g., 22) to sensor 28 while, at the same time, protecting sensor 28 from the rigors of the ambient environment.

In addition, detector assembly 20 might further comprise a lens 36 configured to converge light from scene 22 into sensor 28. As depicted in FIG. 1, lens 36 might be offset some small distance from plate 38. Accordingly, and by way of example, the lens 36 of this illustrative embodiment can comprise a macroscopic lens, such that multiple microlenses and re-imaging are not necessary. In such embodiments of detector assemblies including multiple converging optics, one converging optic might be provided to further converge light already converged by another converging optic. For example, in such embodiments, in addition to causing convergence of infrared light, a lens (e.g., 36) might also have some focusing effects on ultraviolet light that has already been partially converged by another optic (e.g., grating 40).

However, in alternate embodiments, one converging optic might be provided only to converge light within a first wavelength band, while a second converging optic might be provided only to converge light within a second wavelength band. For example, as depicted in FIG. 1, light from scene 22 comprises infrared light 44 and ultraviolet light 46. Grating 40 can be configured to converge ultraviolet light 46 but to allow straight passage of infrared light 44. Lens 36 can allow straight passage of the already converged ultraviolet light 46, but can cause convergence of the previously unconverged infrared light 44. In this manner, each converging optic can operate to converge a portion of the light received by the detector assembly 20 from scene 22. When a plurality of converging optics are configured in this manner to converge portions of light within respective wavelength bands, the focal lengths of the converging optics can be selected to compensate for any offset in order that a common focus position can be attained for the respective images transmitted (e.g., by grating 40 and lens 36). In this manner, a reduced (e.g., slower or less-steep) focal slope can be achieved for one component of light (e.g., the ultraviolet component), which may provide certain advantages. Tuning the respective optics of a detector assembly in order to achieve a common focus position can be most readily altered by adjusting grating 40, for example. In some embodiments, grating 40 can be electronically tunable, such as through involvement of piezoelectric materials. Alternatively and as can be understood by the discussion herein, the functions of these two converging optics could be combined in a single lens which converges both wavelength bands of interest to the same focal point Lens 36, plate 38, and/or other converging or protective optics are preferably highly transmissive in both the ultraviolet and infrared wavelengths. The infrared band to be passed can be selected for atmospheric transmission and to match the mission requirements for the detector and optics. The lens can be designed to have a matched diffractive wavelength in the ultraviolet and refractive focus in the infrared bands. Through the one or more converging optics, sensor 28 can detect an image of scene 22. More particularly, as shown in FIG. 1, sensor 28 can detect a sun image 50 and a tree image 48 corresponding to sun 24 and tree 26 of scene 22, respectively.

A limiter 32 can also be associated with detector assembly 20. Limiter 32 can be configured to receive light from scene 22 through other optic(s) (e.g., lens 36 and/or plate 38) and can selectively enable passage of this light to other elements of detector assembly 20, such as sensor 28. In this embodiment, wherein detector assembly 20 is configured to detect infrared light, a cold filter 30 can be provided between limiter 32 and sensor 28 (but typically not between scene 22 and limiter 32, as limiter 32 can benefit from exposure to ultraviolet light, as described in further detail below). Cold filter 30 can be configured to prevent ultraviolet light 46 from passing to sensor 28, but to allow infrared light 44 to pass uninterrupted to sensor 28. In this manner, when a cold filter 30 is so implemented within detector assembly 20, sensor 28 is only exposed to infrared light. However, in an embodiment wherein detector assembly 20 is configured to detect visible light, the cold filter 30 might be replaced by a warm filter having appropriate transmission characteristics to facilitate the required passage of visible light to sensor 28.

The limiter 32 of this example can comprise one or more elements that are configured to darken (e.g., lose transparency). More particularly, such an element can be configured to selectively limit its transmission of radiation within a predetermined wavelength band in response to its receipt of radiation having a wavelength not within that predetermined band. Such selective transmission can result from a changing electrical, chemical, mechanical or atomic property of the element, such as, for example, is commonly exhibited by certain photochromic, thermochromic, electrochromic or non-linear materials. For example, an element formed from photochromic materials could exhibit both high attenuation in response to a chosen ultraviolet band and good wavelength transmission for an infrared band of interest in the absence of ultraviolet radiation. Alternate elements might comprise filters, liquid crystal materials or other selectively darkening materials. Regardless of the specific material(s) forming limiter 32, the predetermined wavelength band which causes the darkening effect can include ultraviolet light because ultraviolet light has high energy photons that are often well-suited to causing the darkening of a selectively darkening material. Also, ultraviolet light is often quite prevalent in the upper atmosphere where these types of optical limiters might often be employed. Alternatively, in order to enable use of reduced bandwidth optical materials, limiter 32 could be configured to darken upon detection of high energy visible radiation rather than ultraviolet light which has a higher frequency than visible light. In any event, such elements can be selected such that the predetermined wavelength band is well-suited for the intended application of the optical limiter.

In use, an undarkened element of an optical limiter 32 can be substantially transparent to all wavelengths of light. However, when such an element is caused to darken, it becomes less transparent and accordingly serves to significantly attenuate light (e.g., both infrared and ultraviolet light). In this manner, each element of optical limiter 32 can be configured to perform much like a self-darkening eyeglass lens. When a self-darkening eyeglass lens is used indoors, it serves to enable light passage substantially without attenuation. However, when such a lens is used outdoors and is accordingly exposed to ultraviolet light (from the sun), the lens darkens and resultantly attenuates all wavelengths of passing light, including visible light.

Figure 3:
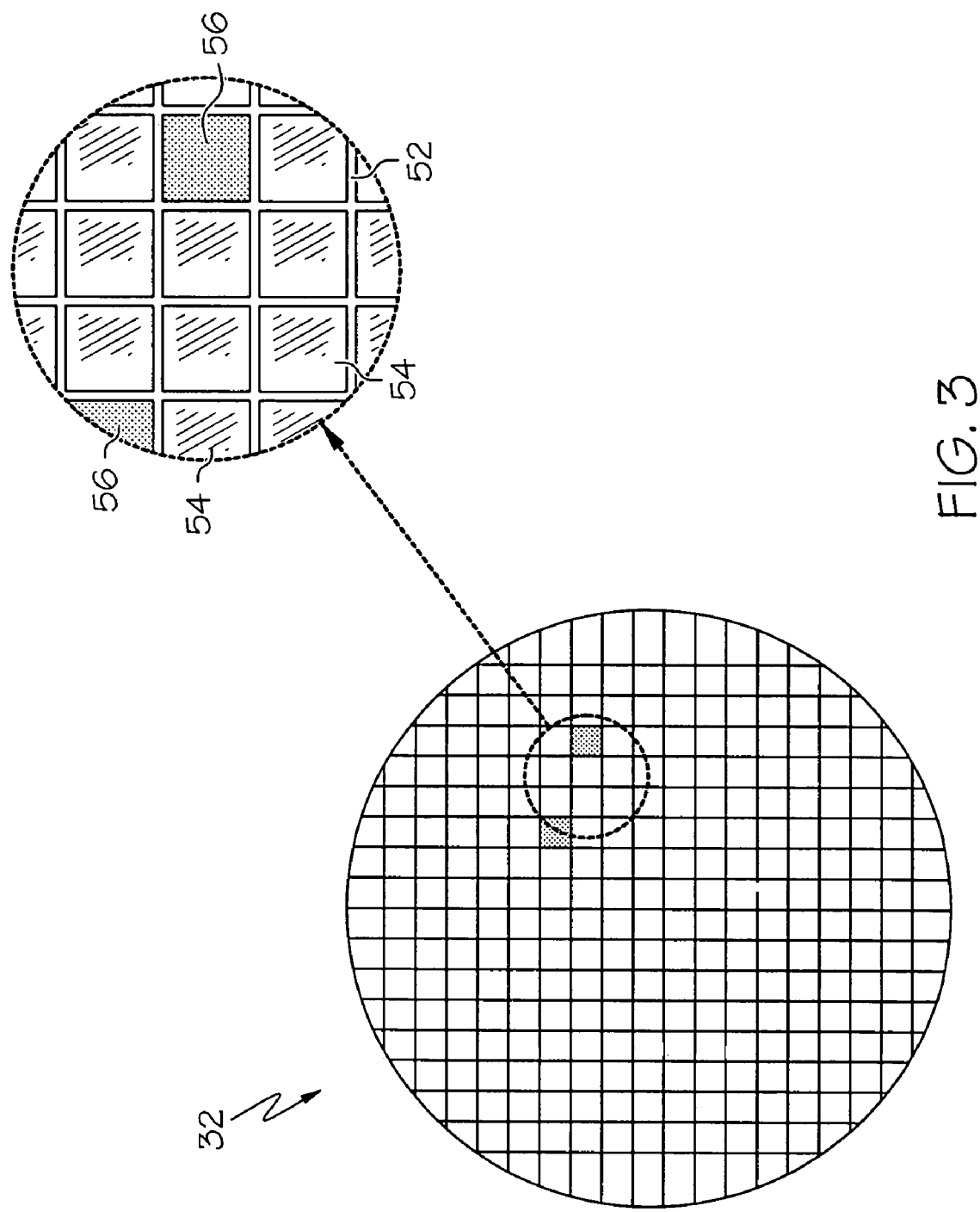
FIG. 3 is a partially exploded front view of an embodiment of an optical limiter made and operating according to the principles of the present invention.

A front view of an exemplary limiter 32 is depicted in FIG. 3. As shown, limiter 32 comprises a plurality of elements (e.g., 54, 56) disposed upon or otherwise arranged into a substantially flat surface. Each of these elements can correspond with one or more pixels of an associated sensor 28. For example, a separate element of limiter 32 might be provided to correspond with each pixel in the associated sensor 28. Alternatively, a separate element might correspond with a plurality of pixels that form a field within an associated sensor 28. Regardless of the number of pixels to which a single element corresponds, the configuration of the elements within limiter 32 can assume a variety of configurations. In one embodiment, the elements might reside upon a single piece of photochromatic material with etchings separating each of the elements. In an alternate embodiment, as depicted by FIG. 3, limiter 32 might comprise individual photochromatic elements separated by one or more barriers 52. A barrier 52, for example, can be configured to prevent spillover of photons or electrons from one element to another element within limiter 32. Therefore, the elements may be separated, isolated, and/or segregated from one another. In still further embodiments, the elements may be unseparated from each other (e.g., free of etchings or barriers).

Each of the elements of limiter 32 can be configured to selectively darken upon receipt of light within a certain wavelength band. As depicted in FIG. 3, two elements (e.g., 56) are depicted as having darkened in response to their reception of light within a certain wavelength band. Undarkened elements (e.g., 54) have not darkened because they have not received sufficient light within the predetermined wavelength band.

Hence, in this manner, limiter 32 can serve as a spatially and spectrally selective optical limiter, wherein light within one wavelength band (e.g., infrared light) can be attenuated in response to an increase of light within another wavelength band (e.g., ultraviolet light). For example, with reference to FIGS. 1 and 3, when limiter 32 receives ultraviolet light 46 from sun 24, limiter 32 can attenuate both ultraviolet light and infrared light passing through limiter 32. More particularly, when a significant ultraviolet light source (e.g., the sun 24) comprises a portion of scene 22, elements in limiter 32 associated with the portion of scene 22 will be darkened, thereby attenuating the light in that portion. The attenuated light can then be passed to sensor 28. Because the attenuated light is of sufficiently low intensity, sensor 28 is not saturated.

For example, the ultraviolet image of the sun can activate the photochromic effect in that portion of the image only. The photochromic effect can be very rapid and can cause a broadband darkening of corresponding elements (e.g., 54, 56) in limiter 32. This is well known as resulting from the promotion of electrons in the conduction band where photons are absorbed across a broad range of energies. This photochromic effect limits the solar photon flux transmitted through an associated element in the ultraviolet through infrared region of the wavelength spectrum, but only for elements receiving the solar disk portion of the image. Hence, saturation or damage to sensor 28 from the intense solar radiation can thereby be avoided. Importantly, however, full sensitivity is maintained in the other portions of the image. Again referring to FIG. 1, although the respective elements of limiter 32 associated with sun 24 attenuate light received from sun 24, elements not associated with the portion of scene 22 containing sun 24, such as elements relating to tree 26, do not darken and thereby enable light from such objects to pass through limiter 32 unattenuated. In this manner, sensor 28 can receive an accurate and substantially complete view of scene 22 containing sun 24, and can continually receive an unattenuated view of other objects (e.g., tree 26) in scene 22 without disturbance from sun 24 and without attenuation due to the limiting effect being spatially contained to certain portions of the scene (which cause corresponding darkening in only certain portions of the limiter).

Accordingly, as can be understood by the above description, the exemplary system is configured to detect radiation within a certain wavelength band of interest. However, the elements in the optical limiter will filter or attenuate this in-band radiation when radiation is received that is of a certain wavelength band not within that band of interest. In other words, the in-band filtering ability of the optical limiter is activated or pumped by the receipt of certain out-of-band radiation wavelengths. For example, in an infrared detector system, out-of-band shortwave ultraviolet radiation from the sun is known to accompany high-intensity in-band longer wave infrared radiation which can cause blooming effects in the infrared components. As described elsewhere herein and as shown in the drawings, an exemplary limiter element can be pumped by the out-of-band ultraviolet radiation in order to attenuate the in-band infrared radiation. This out-of-band pumping for filtering in-band radiation can be described as out-of-band-triggered in-band filtering, or transpectral filtering. Such filtering can be achieved in a number of manners, such as via use of a photochromic material (to cause a filtering change based upon a chemical change in the material), via the use of electronic sensing components (which sense radiation in the out-of-band wavelengths and create an electrical signal which causes the change of the in-band filtering effect of a filter), via a thermochromic material (which causes a change in the in-band filtering effect based upon receipt of out-of-band heat radiation), via a non-linear optical material (which involves movement based upon out-of-band radiation received to thereby cause a change of an in-band filtering effect), or via other suitable materials or devices.

In certain exemplary embodiments of the present invention, the intended object for detection might emit some ultraviolet radiation within a certain band of wavelengths which corresponds with the same wavelengths which will cause the out-of-band-triggered in-band filtering effect. It may not be desirable for light within this band to trigger the darkening of limiter 32 for filtering of infrared radiation which is also emitted from the object, because the infrared display or detection of the object would resultantly be attenuated by limiter 32, and the object would not be clearly viewed or detected, even though it is an object of interest. Accordingly, coating 42 could be modified so as to exclude light having wavelengths within the band associated with the intended object for detection and limiter 32 can be configured to darken upon reception of light having a band different or broader than that associated with the intended object for detection. For example, in one exemplary embodiment of the present invention, detector assembly 20 might be employed as an infrared imaging system for missile warning, such as those present on military aircraft. Missiles often emit ultraviolet radiation within the 260 nm–350 nm wavelength band. If coating 42 is configured to pass light within the 260 nm–350 nm wavelength band to optical limiter 32, then optical limiter 32 will produce self-attenuating effects for the missile. This, of course, will reduce effectiveness for the missile warning role of the associated detector assembly 20. However, if coating 42 is configured to exclude this wavelength band (260 nm to 350 nm), then performance for missile detection is not compromised. Accordingly, in such a situation, a coating can be provided to reject light within a wavelength band of interest that would normally excite the out-of-band-triggered in-band filtering effect, but to pass light within another wavelength band in order that the effect of optical limiter 32 can be excited thereby.

Figure 2:
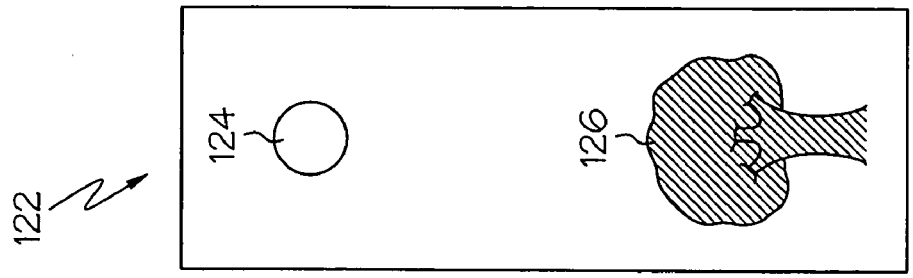
FIG. 2 is a schematic diagram depicting a detector assembly in accordance with another exemplary embodiment of the present invention.
Figure 2:
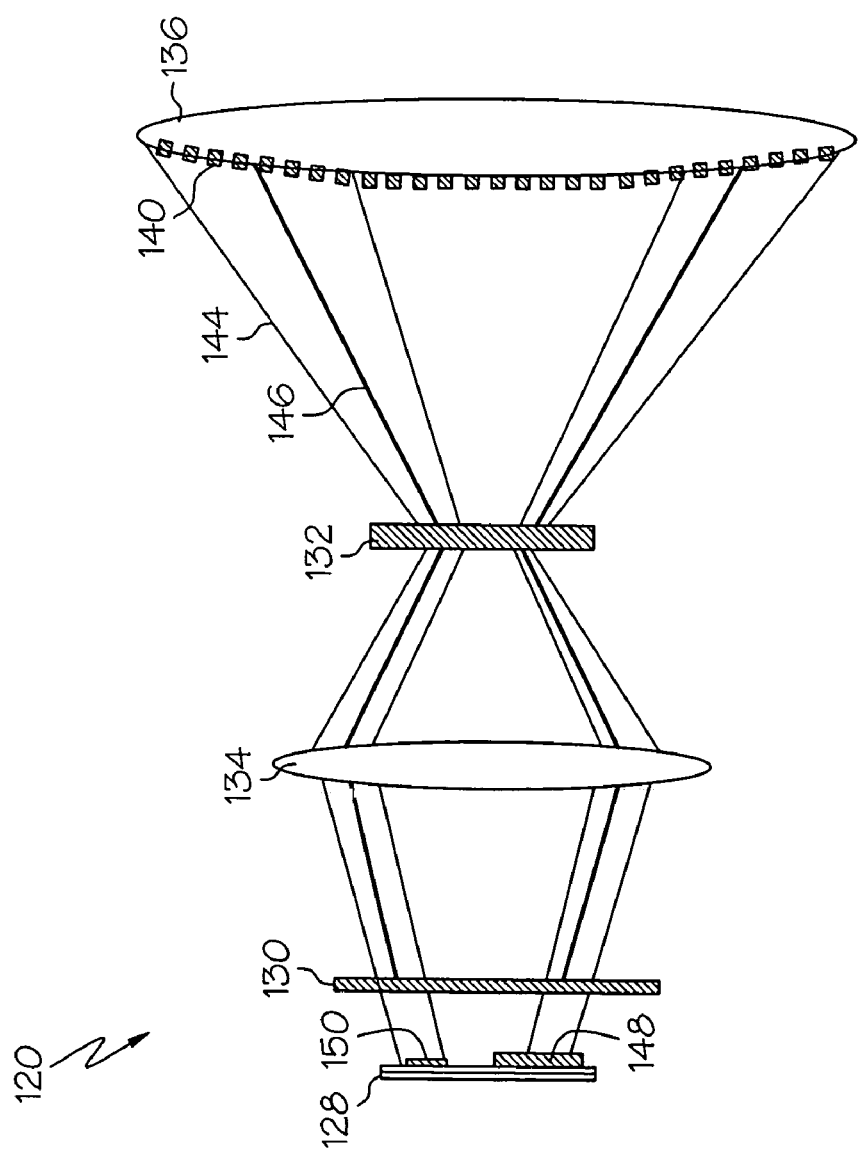

In an alternate embodiment, as depicted by FIG. 2, a detector assembly 120 including re-imaging is depicted. The detector assembly 120 can receive light corresponding to a scene 122 which can include the sun 124 and a tree 126, for example. Light emitted or reflected from objects in scene 122 can be received through one or more converging optics, such as a lens 136, for example. Lens 136 can be configured to converge light within various wavelength bands. A grating 140 might also be associated with lens 136 to assist in the convergence of light from scene 122. In one embodiment, a coating (not shown) might also be applied to lens 136, such as to protect lens 136 or to reject light within certain wavelength bands.

Light from scene 122 can include infrared light 144 and ultraviolet light 146, for example. The incoming light from scene 122 can be converged by lens 136 at a focal point located within detector assembly 120, for example. A limiter 132 can be located at the focal point within detector assembly 120. The limiter 132 can selectively attenuate the incoming light both spectrally and spatially. More specifically, limiter 132 can attenuate passing light at specific locations of the limiter in response to increasing intensity of ultraviolet light 146 received by limiter 132 at those specific locations. Light passing through limiter 132 can then diverge into lens 134, and lens 134 can re-converge the light toward sensor 128. Sensor 128 can then detect images relating to each of the objects within scene 122. More specifically, sensor 128 can identify a sun image 150 relating to sun 124 and a tree image 148 relating to tree 126, for example. In the event that detector assembly 120 is configured to detect infrared light as opposed to visible light, a cold filter 130 can be provided between limiter 132 and sensor 128. Cold filter 130 can be configured to filter ultraviolet light, for example, to prevent ultraviolet light from reaching sensor 128. However, in an alternate embodiment wherein detector assembly 120 is configured to detect visible light, detector assembly 120 does not include cold filter 130. In any event, scene 122 can be re-imaged onto detector 128, with the image unattenuated except for its portion of the image corresponding to sun 124. Accordingly, sensor 128 detects scene 122 without attenuation, except for attenuation in the specific portion of scene 122 bounded by the sun 124.

Figure 4:
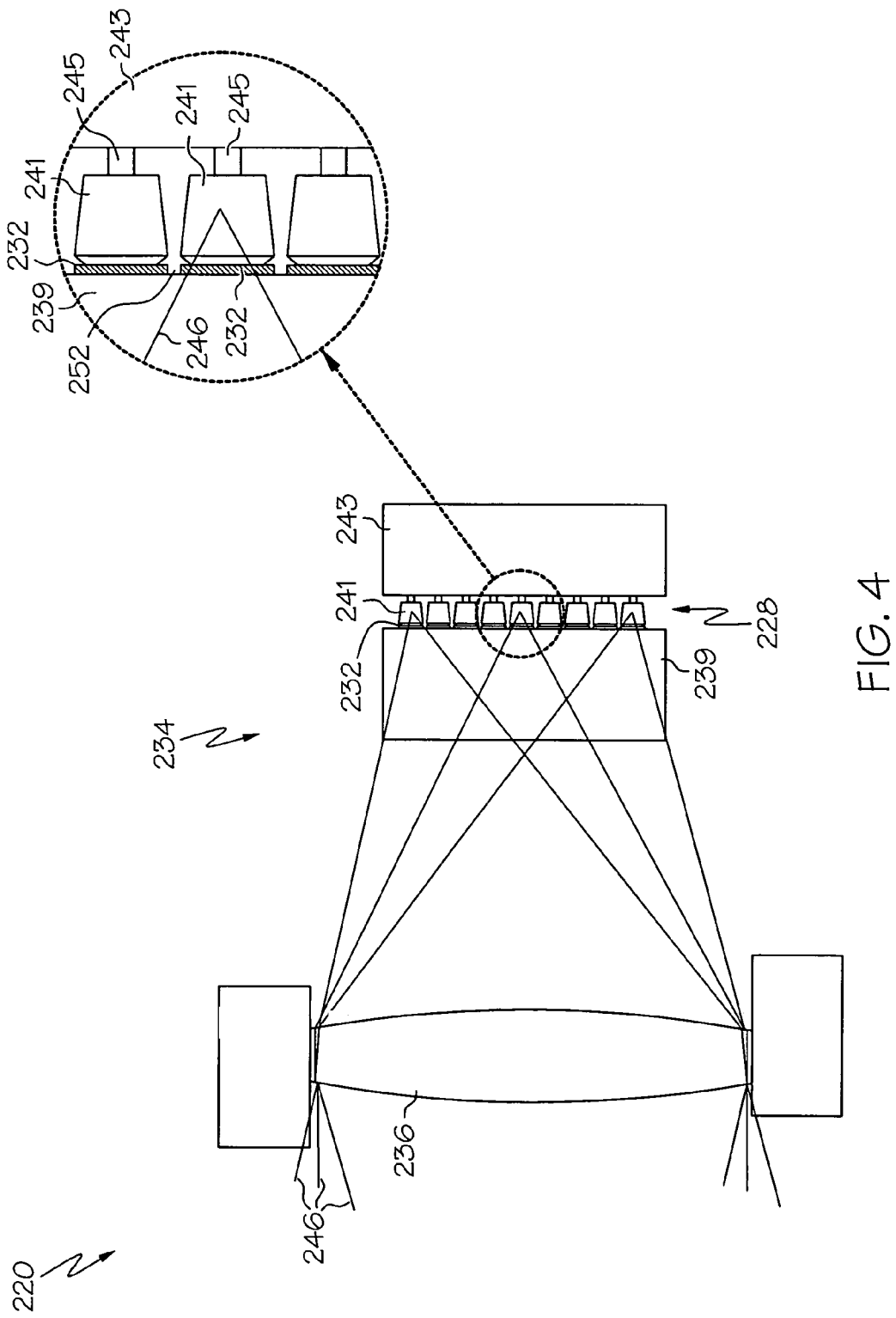
FIG. 4 is a partially exploded schematic diagram depicting a detector assembly in accordance with yet another exemplary embodiment of the present invention.

In still another illustrative embodiment of the present invention, as depicted in FIG. 4, for example, a detector assembly 220 comprises an optical limiter 232 disposed substantially adjacent to a focal plane array 228. More particularly, optical limiter 232 can comprise a photochromic material that is affixed to one or more detectors 241 forming a detection surface of a focal plane array 228. Each detector 241 can connect to an integrated circuit 243 or another electrical interface with an electrical contact 245, for example. Although a single optical limiter 232 could be associated with more than one detector 241, in the illustrative embodiment depicted by FIG. 4, a separate optical limiter 232 is provided for each detector 241 and these respective optical limiters 232 can be separated from each other by an air gap or other material or barrier 252. In this example, one optical limiter 232 is provided for each detector 241, and each limiter/detector pair is provided at a pixel location for the system 234, although other ratios of limiters and detectors per pixel may be utilized in other exemplary embodiments.

In use, and as shown by FIG. 4, detector assembly 220 receives light 246 through a single focusing lens 236, which causes light 246 within multiple wavelength bands to converge inwardly toward focal plane array 228. Before reaching focal plane array 228, light 246 can first travel through an optically transparent substrate 239. This optically transparent substrate 239 might comprise a silicon-based material and can serve as a light pipe, for example, such as to effectively channel incoming light 246 toward focal plane array 228. After passing through optically transparent substrate 239, light 246 then encounters a layer containing one or more optical limiters 232. Light 246 passing through optical limiter(s) 232 is then received by detectors 241. In response, electrons flow from detectors 241 to an integrated circuit 243 connected to detectors 241 with respective electrical contacts 245. Integrated circuit 243 can then ensure that these electrons are properly routed for processing, such that a corresponding image can be generated on a screen or other media device for viewing by an operator, for example.

Although the foregoing description has primarily discussed the association of a limiter (e.g., 32, 132, 232) with a sensor (e.g., 28, 128, 228), it is to be understood that such a limiter can be provided for use with any optical viewing device. For example, a limiter in accordance with the present invention can be associated with an ordinary telescope. If such a telescope were aimed at a scene including the sun, for example, one or more elements of the limiter could darken and thereby attenuate the passage of light from the sun. In this manner, a user of the telescope could point the telescope in the direction of the sun and could view a scene including the sun without necessarily sustaining optical damage from the sun. Furthermore, the user of such a telescope could view another object within the same scene, such as an airplane, without being blinded by the sun and without the image of the airplane being disrupted by the sun. Conversely, if a conventional telescope were used in this manner, the user would not be able to see the airplane because of the high intensity solar radiation, and would likely sustain retinal damage as a result of the sun's presence within the scene.

As another example, a limiter in accordance with the present invention could be associated with a night scope, night-vision binoculars, or another nocturnal viewing device. When a certain conventional nocturnal viewing device views a scene containing a significant source of natural or artificial light, the associated sensor can be flooded with photons and the nocturnal viewing device may provide a user with a blinding display. Such a significant source of light might be provided by the sun, a flame, an incandescent light bulb (e.g., a flashlight or automobile headlamp), a fluorescent light bulb, an LED, or another such source, for example. In addition to temporarily blinding the user, the nocturnal viewing device in those circumstances is often unable to provide the user with any detail from the scene and might actually cause damage to the user's eyes. Conversely, a nocturnal viewing device having a limiter in accordance with the present invention would not be adversely affected by a significant source of light in this manner. Rather, when such a nocturnal viewing device is directed toward a scene containing a significant light source, the limiter could filter this ultraviolet and/or infrared light. More particularly, in response to the detected ultraviolet light, certain elements of the limiter could darken and thereby attenuate both the ultraviolet and infrared light originating from such a source. Hence, if a flashlight were aimed in the direction of such a nocturnal viewing device, an associated limiter would selectively attenuate the light from the flashlight at the specific location(s) where that light is received, without diminishing resolution or intensity of light reflected or emitted from other aspects of the scene. Also, by associating a limiter with a nocturnal viewing device in accordance with the present invention, the useful life of the sensor within the nocturnal viewing device might also be extended, as this sensor would no longer be subjected to the excessive quantities of photons often received from certain significant light sources. Furthermore, such a limiter could prevent an operator from being temporarily blinded by the nocturnal viewing device upon its reception of light from such a source, while still enabling an operator to detect the full amount of radiation from other portions of the scene not including the light source.

In still a further embodiment, an optical limiter in accordance with the present invention might be incorporated within a digital camera. Such an optical limiter could prevent blurring, blooming or other distortions of the internal sensor that would normally be caused by the presence of high-energy light sources within a viewed scene. Accordingly, the optical camera could effectively take pictures and/or video of a scene including the sun or another light source, wherein portions of the scene other than the sun and/or light source would be substantially un-attenuated.

It should be understood that the number and arrangement of components in any of the aforementioned structures can vary significantly depending upon the use or application contemplated for the particular device. More particularly, the components of a detector assembly can include virtually any combination of optics arranged in any of a plurality of suitable configurations. It is also contemplated that one or more optics or other components of a detector assembly can be manufactured integrally. Also, multiple such components can be substituted with a single component, as may a single component be substituted with multiple components. Still further, it is to be understood that many specific configurations are contemplated for an optical limiter in accordance with the present invention, although only a limited few such configurations have been disclosed herein. Other available configurations of the optical limiter shall be apparent to one having ordinary skill in the art upon the reading of this disclosure.

The foregoing description of exemplary embodiments and examples of the invention has been presented for purposes of illustration and description. It is not intended to be exhaustive or to limit the invention to the forms described. Numerous modifications are possible in light of above teachings. Some of those modifications have been discussed, and others will be understood by those skilled in the art. The embodiments were chosen and described in order to best illustrate the principles of the invention and various embodiments as are suited to the particular use contemplated. The scope of the invention is, of course, not limited to the examples or exemplary embodiments set forth herein, but can be employed in any number of applications and equivalent devices by those of ordinary skill in the art.

What is claimed is:

1. An infrared detector assembly comprising:
   an infrared sensor configured to receive infrared radiation emitted from a scene; and
   at least one limiter element positioned between the sensor and the scene, such that the infrared sensor is configured to receive the radiation through said limiter element, wherein the limiter element is configured to limit the amount of infrared radiation that may pass to the sensor in response to its receipt of non-infrared radiation, wherein said limiter element provides said limiting by changing transparency in response to solar radiation in the ultraviolet band, wherein said change in transparency affects the passage through said limiter element of solar radiation in the infrared band.

2. The infrared detector assembly of claim 1 wherein the infrared sensor comprises a focal plane array.

3. The infrared detector assembly of claim 1 further comprising a cold filter, wherein the infrared sensor is configured to receive the radiation only after the radiation has passed through the cold filter.

4. The infrared detector assembly of claim 1 further comprising:
   a plurality of said limiter elements separated by barrier elements arranged between the limiter elements and configured to prevent spillover of attenuation effects from one limiter element to an adjacent limiter element.

5. The infrared detector of claim 1, wherein the limiter element comprises a photochromic material.

6. The infrared detector of claim 1, wherein said limiter element comprises a plurality of separated photochromic optics, wherein each photochromic optic is configured to selectively pass a respective portion of the radiation from a scene.

7. An optical limiter comprising:
   an array of optics, wherein the array is configured to facilitate transmission of light corresponding to a scene, and wherein each optic is configured to receive a respective portion of the light corresponding to a respective portion of the scene, wherein respective portions of light can comprise low frequency radiation and high frequency radiation, and wherein each optic is configured to increase attenuation of the low frequency radiation when the intensity of the high frequency radiation increases, wherein the low frequency radiation is infrared light and the high frequency radiation is ultraviolet light.

8. The optical limiter of claim 7 wherein the ultraviolet light is produced by the sun.

9. The optical limiter of claim 7 wherein each optic comprises photochromic material.

10. The optical limiter of claim 7 wherein said optics are separated from each other by at least one boundary.

11. A light detector assembly comprising:

a focal plane array comprising a plurality of pixels, wherein each pixel is included within one of a plurality of fields, and wherein each pixel includes at least one sensor configured to sense light having a first wavelength;

an optical passage associated with each field, wherein the optical passage is configured to attenuate light having the first wavelength when the intensity of light having a second but different wavelength increases, wherein the first wavelength light comprises infrared light and the second wavelength light comprises ultraviolet light; and a macroscopic lens configured to converge light having at least one of the first and second wavelengths toward the optical passage.

12. The light detector assembly of claim 11 wherein each field contains only one pixel.

13. The light detector assembly of claim 11 wherein the optical passages are separated from each other by at least one boundary.

14. The light detector assembly of claim 11 wherein each optical passage comprises photochromic material.

15. A method of limiting light energy comprising:

receiving portions of light corresponding to respective portions of a scene within each of a plurality of optics, wherein a first portion of light comprises light having a first wavelength and light having a second but different wavelength;

for each optic receiving said first portion of light, attenuating the light transmitted through the optic having the first wavelength when the intensity of light received having the second wavelength increases; and sensing the attenuated light having the first wavelength after it has passed through the optics;

wherein said first portion of light is received from the sun.

16. The method of limiting light energy of claim 15 wherein the operation of attenuating light comprises a change in optic transparency.

17. The method of limiting light energy of claim 15 wherein said optic is provided having photochromic properties.

18. The method of limiting light energy of claim 15, wherein the light having the first wavelength comprises infrared light and the light having the second wavelength comprises ultraviolet light.

19. The method of limiting light energy of claim 15, further comprising:

converging the portions of light using a single lens and without re-imaging components.

20. The method of limiting light energy of claim 15, further comprising:

filtering the attenuated light using a cold filter.

21. The method of limiting light energy of claim 15, wherein the sensing operation is conducted by a cryogenically cooled sensor.

22. A sensor comprising:

pixels configured to sense radiation within a predetermined wavelength range from a scene;

a plurality of filter elements associated with the pixels, wherein each filter element is disposed between the scene and at least one pixel, wherein each filter element is configured to attenuate the passage to the at least one pixel of radiation within the predetermined wavelength range in response to radiation outside of the predetermined wavelength range, such that said radiation outside of the predetermined wavelength range is received from the sun; and barrier elements arranged between the filter elements and configured to prevent spillover of attenuation effects from one filter element to an adjacent filter element.

23. The sensor of claim 22 wherein the predetermined wavelength range comprises infrared radiation.

24. The sensor of claim 22 wherein at least a portion of the sensor is cryogenically cooled.

25. The sensor of claim 22 wherein the scene is re-imaged before being received by said filter elements.

26. The sensor of claim 22 further comprising a cold filter positioned between the pixels and the scene.

27. The sensor of claim 22, wherein the filter elements each comprise at least one of a photochromic device, a non-linear device, a thermochromic device, and an electrochromic device.

28. An infrared detector assembly comprising:

a focal plane array comprising a plurality of pixels configured to detect infrared radiation from a scene, wherein each pixel is included within one of a plurality of fields; and a limiter disposed between the scene and the focal plane array, the limiter comprising a plurality of photochromic elements separated from each other by at least one barrier, wherein each photochromic element is associated with one of said fields, is configured to lose optical transparency in response to ultraviolet radiation from the scene, and is configured to thereby attenuate infrared radiation from the scene to said field.

* * * * *